United States Patent
Ha et al.

(10) Patent No.: US 9,105,909 B2
(45) Date of Patent: Aug. 11, 2015

(54) SEPARATOR, LITHIUM BATTERY INCLUDING THE SEPARATOR, AND METHOD OF PREPARING THE SEPARATOR

(71) Applicant: Samsung SDI Co., Ltd., Yongin, Gyeonggi-Do (KR)

(72) Inventors: Jeong-Ki Ha, Yongin-si (KR); Yong-Beom Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 93 days.

(21) Appl. No.: 13/934,445

(22) Filed: Jul. 3, 2013

(65) Prior Publication Data
US 2014/0038025 A1     Feb. 6, 2014

(30) Foreign Application Priority Data
Jul. 31, 2012  (KR) .................... 10-2012-0084188

(51) Int. Cl.
*H01M 2/14*     (2006.01)
*H01M 2/16*     (2006.01)
*H01M 10/14*   (2006.01)

(52) U.S. Cl.
CPC .......... *H01M 2/1653* (2013.01); *H01M 2/1686* (2013.01); *H01M 2/1666* (2013.01); *H01M 10/14* (2013.01)

(58) Field of Classification Search
CPC . H01M 2/1653; H01M 2/1673; H01M 10/14; H01M 2/1686
USPC ........... 429/129, 134, 135, 309, 216, 231.95, 429/249, 246
See application file for complete search history.

(56) References Cited

U.S. PATENT DOCUMENTS

| | | | |
|---|---|---|---|
| 6,322,923 B1 | 11/2001 | Spotnitz et al. | |
| 7,794,511 B2 | 9/2010 | Wensley et al. | |
| 8,003,263 B2 | 8/2011 | Kim et al. | |
| 2004/0241550 A1* | 12/2004 | Wensley et al. | 429/247 |
| 2005/0079406 A1 | 4/2005 | Daido et al. | |
| 2005/0277026 A1 | 12/2005 | Nishikawa et al. | |
| 2006/0286459 A1* | 12/2006 | Zhao et al. | 429/326 |
| 2010/0209757 A1 | 8/2010 | Ooyama et al. | |
| 2012/0258349 A1 | 10/2012 | Hayakawa et al. | |

FOREIGN PATENT DOCUMENTS

| | | |
|---|---|---|
| JP | 2010-027218 | 2/2010 |
| JP | 2010-192200 | 9/2010 |
| KR | 10-2001-0095623 | 11/2001 |
| KR | 10-2004-0103425 | 12/2004 |

\* cited by examiner

*Primary Examiner* — Patrick Ryan
*Assistant Examiner* — Ben Lewis
(74) *Attorney, Agent, or Firm* — Robert E. Bushnell, Esq.

(57) ABSTRACT

A separator for a battery having a porous base material layer and a polymer coating layer formed on at least a surface of the base material layer. The polymer coating layer includes a first fluorinated copolymer and a non-fluorinated polymer. A weight ratio of the first fluorinated copolymer to the non-fluorinated polymer is in a range of 3:1 to 1:3.

20 Claims, 2 Drawing Sheets

SEPARATOR, LITHIUM BATTERY INCLUDING THE SEPARATOR, AND METHOD OF PREPARING THE SEPARATOR

CLAIM PRIORITY

This application makes reference to, incorporates the same herein, and claims all benefits accruing under 35 U.S.C. §119 from an application earlier filed in the Korean Intellectual Property Office on 31 Jul. 2012 and there duly assigned Serial No. 10-2012-0084188.

BACKGROUND OF THE INVENTION

1. Field of the Invention

One or more embodiments of the present invention generally relate to a separator which may be used in a battery.

2. Description of the Related Art

In line with miniaturization and high performance of various devices, demand for small and light-weight batteries has increased. In addition, for example, for use in electric vehicles, discharging capacity, energy density, and cyclic characteristics of a lithium battery are regarded as important factors. For use in such applications, a lithium battery having high discharge capacity, high energy density, and excellent lifetime characteristics per unit volume is required.

The above information disclosed in this Related Art section is only for enhancement of understanding of the background of the invention and therefore it may contain information that does not form the prior art that is already known to a person of ordinary skill in the art.

SUMMARY OF THE INVENTION

One or more embodiments of the present invention include a separator that has an increased adhesive force with respect to an electrode.

One or more embodiments of the present invention include a lithium battery including the separator.

One or more embodiments of the present invention include a method of preparing the separator.

Additional aspects will be set forth in part in the description which follows and, in part, will be apparent from the description, or may be learned by practice of the presented embodiments.

According to one or more embodiments of the present invention, a separator includes: a porous base material layer; and a polymer coating layer formed on at least a surface of the base material layer, wherein the polymer coating layer includes a first fluorinated copolymer, and a non-fluorinated polymer, and a weight ratio of the first fluorinated copolymer to the non-fluorinated polymer is in a range of 3:1 to 1:3.

According to one or more embodiments of the present invention, a lithium battery including a positive electrode, a negative electrode, an organic electrolytic solution, and a separator interposed between the positive electrode and the negative electrode, wherein the separator is selected from the separators of any one of claims 1 to 13.

According to one or more embodiments of the present invention, a method of preparing a separator includes: coating a polymer solution on at least a portion of the porous base material layer; immersing the coated porous base material layer in a non-solvent; and drying the coated porous base material layer to remove the non-solvent, wherein the polymer solution includes a fluorinated copolymer and a non-fluorinated copolymer at a weight ratio of 3:1 to 1:3

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE DRAWING

Figure 1:
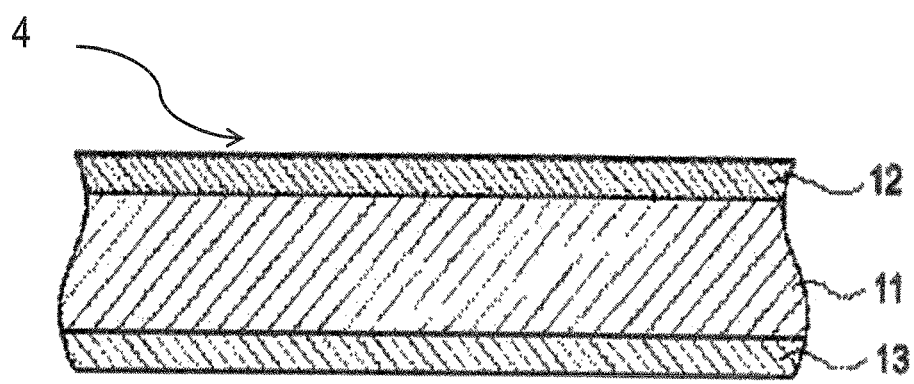
FIG. 1 is a schematic view of a separator according to an embodiment of the present invention.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like or similar reference numerals refer to like or similar elements throughout. As used herein, the term "and/or" includes any and all combinations of one or more of the associated listed items.

It will be understood that, although the terms first, second, third etc. may be used herein to describe various elements, components, regions, layers, patterns and/or sections, these elements, components, regions, layers, patterns and/or sections should not be limited by these terms. These terms are only used to distinguish one element, component, region, layer pattern or section from another region, layer, pattern or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the invention. As used herein, the singular forms "a," "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross sectional illustrations that are schematic illustrations of illustratively idealized example embodiments (and intermediate structures) of the inventive concept. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. The regions illustrated in the figures are schematic in nature and their shapes are not intended to illustrate the actual shape of a region of a device and are not intended to limit the scope of the inventive concept.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Generally a lithium battery, a separator is interposed between a positive electrode and an anode electrode to prevent short-circuiting. A typical organic-based separator may melt at a temperature of 200° C. or lower, and thus, when the temperature of a battery increases due to interior and/or exterior stimuli, volumetric change, such as shrinking or melting of the separator, occurs, and thus, the operation of the battery may stop.

Further, a typical separator has a relatively low adhesive force with respect to an electrode, and thus, an a distance between electrodes increases during charging and discharging, a battery may easily expand and a volume thereof increases, thereby reducing capacity and energy density of a battery per unit volume.

In addition, the substantial volumetric change of a battery may lead to the formation of a gap within the battery or destruction of a separator. Accordingly, the capacity and energy density of a lithium battery including a separator may decrease and lifetime characteristics thereof may decrease.

Thus, as will be discussed in detail below with regards to the exemplary embodiments of the present invention, a separator that has an increased adhesive force with respect to an electrode may significantly improve the life expectancy and operational characteristics of the battery.

Hereinafter, a separator 4, a lithium battery 1 including the separator 4, and a method of preparing the separator 4, according to embodiments of the present invention, are described in detail.

A separator 4 according to an embodiment of the present invention includes a porous base material layer 11; and a polymer coating layer (12 and 13) formed on at least a portion of the porous base material layer 11, wherein the polymer coating layer (12 and 13) includes a first fluorinated copolymer and a non-fluorinated polymer, and a weight ratio of the first fluorinated copolymer to the non-fluorinated polymer is in a range of 3:1 to 1:3. For example, a weight ratio of the first fluorinated copolymer to the non-fluorinated polymer in the separator 4 may be in a range of 2:1 to 1:2.

Due to the inclusion of a fluorinated copolymer and a non-fluorinated polymer at a predetermined ratio, the separator 4 may have an increased adhesive force with respect to an electrode regardless of a binder and an electrolytic solution included in the negative electrode 2 or the positive electrode 3. Accordingly, a jelly-roll structure including a negative electrode 2, a positive electrode 3 and a separator 4 may have high stability. In addition, lifetime characteristics of the lithium battery 1 may be improved, and a volumetric change of the lithium battery 1 during charging and discharging may be suppressed. For example, stability of a pouch-shape lithium battery including an organic electrolytic solution may be improved.

When the weight ratio of the first fluorinated copolymer to the non-fluorinated polymer is greater than 3:1, the adhesive force may decrease, and when the weight ratio of the first fluorinated copolymer to the non-fluorinated polymer is smaller than 1:3, a resistance of a formed battery may increase.

The separator 4 may include, for example, as illustrated in FIG. 1, a base material layer 11 and polymer coating layers 12 and 13.

The first fluorinated copolymer may be one selected from the group consisting of a polyvinylidene fluoride-hexafluoropropylene (PVdF-HFP) copolymer, a polyvinylidene fluoride-polytetrafluoroethylene (PVdF-PTFE) copolymer, and a polyvinylidene fluoride-polytetrafluoroethylene-hexafluoropropylene (PVdF-PTFE-HFP) copolymer, but is not limited thereto. For example, any fluorinated copolymer that is available in the art may be used as the first fluorinated copolymer.

A weight average molecular amount (Mw) of the first fluorinated copolymer may be in a range of about 10,000 to about 1,500,000. For example, the weight average molecular amount (Mw) of the first fluorinated copolymer may be in a range of about 10,000 to about 600,000. For example, a weight average molecular amount Mw of the first fluorinated copolymer may be in a range of about 100,000 to about 600,000. When the weight average molecular amount (Mw) of the first fluorinated copolymer is too high, the solubility of the first fluorinated copolymer with respect to a solvent may be too low and the viscosity of a copolymer solution is too high, and thus, handling thereof may be difficult. On the other hand, when the weight average molecular amount (Mw) of the first fluorinated copolymer is too low, it is difficult to obtain a uniform coating layer.

The non-fluorinated polymer of the separator may have a surface energy that is higher than that of the first fluorinated polymer. For example, a surface energy of the non-fluorinated polymer may be about 35 mN/m or more at the temperature of 20° C. For example, the non-fluorinated polymer may have a surface energy of about 40 mN/m or more at the temperature of 20° C. Since the first fluorinated polymer has a lower surface energy, the first fluorinated polymer may have a low adhesive force with respect to an electrode that does not include a fluorinated binder. However, since the non-fluorinated polymer has a higher surface energy, an adhesive force of the non-fluorinated polymer with respect to an electrode that does not include a fluorinated binder may increase.

The non-fluorinated polymer of the separator may include at least one selected from the group consisting of polyacrylate, polymethacrylate, polyamide (PA), polyimide (PI), a polyamide-imide copolymer, polyacrylonitrile (PAN), polyethyleneoxide (PEO), polypropyleneoxide (PPO), a polyethyleneoxide-proyleneoxide (PEO-PO) copolymer, polyvinylacetate (PVA), polyethylenevinylacetate (PEVA), and polymethylmethacrylate (PMMA).

For example, the non-fluorinated polymer may be a polymer obtained from at least one monomer selected from the group consisting of an acrylic acid, methylacrylate, ethylacrylate, methylmethacrylate, and methylethacrylate.

The polymer coating layers 12 and 13 of the separator may be formed as a gel. When the polymer coating layers 12 and 13 are formed as a gel, an adhesive force of the separator with respect to an electrode may be improved.

The polymer coating layers 12 and 13 may additionally include at least one second fluorinated polymer that is different from the first fluorinated copolymer. The second fluorinated polymer may be different from the first fluorinated polymer, and may be any one of various fluorinated copolymers that are available in the art.

The polymer coating layers 12 and 13 of the separator may each have a thickness of about 0.5 μm to about 10 μm. For example, each of the polymer coating layers 12 and 13 may have a thickness of about 1 μm to about 5 μm. When the thickness of each of the polymer coating layers 12 and 13 is too small, an adhesive force between the separator and an electrode may decrease, and the thickness of each of the polymer coating layers 12 and 13 is too great, a resistance of a formed battery may increase.

The porous base material layer 11 of the separator may be an organic layer. The porous base material layer 11 does not have electron conductivity and does have ionic conductivity and may have high durability with respect to an organic solvent. A porous film having small pore sizes may be used as the porous base material layer 11.

The porous base material layer 11 of the separator may be a film including polyolefin. Polyolefin has excellent short-circuiting prevention effects and also shut-down effects, and due to these effects, polyolefin may provide high stability to a formed battery. For example, the porous base material layer 11 may be a film formed of a resin, such as, a polyolefin selected from polyethylene, polypropylene, polybutene, polyvinyl chloride, and the like, or a mixture or copolymer thereof, but is not limited thereto. For example, the porous base material layer 11 may be any one of various porous films that are available in the art. For example, as the porous base material layer 11, a porous film formed of a polyolefin resin, a porous film formed by texturing polyolefin-based fiber, a non-woven fabric including polyolefin; or an agglomerate of insulating material particles may be used. For example, when a porous film including polyolefin is used, a polymer solution for preparing a polymer coating layer formed on a base material layer may be easily coated on the base material layer and a formed separator may have a narrower thickness. Accordingly, an amount of an electrode active material in an electrode may increase, and thus, a capacity of a battery per volume may increase.

For example, the polyolefin used as a material for forming the porous base material layer 11 may be a homopolymer, such as polyethylene or polypropylene, a copolymer of these homopolymers, or a mixture of these homopolymers. The polyethylene may be a low-density, middle-density, or high-density polyethylene, and in terms of mechanical strength, a high-density polyethylene may be used herein. In addition, for flexibility, at least two polyethylenes may be mixed for use. A polymerization catalyst used in preparing the polyethylene may not be limited, and may be, for example, a Ziegler-Natta based catalyst, a Philips catalyst, or a metallocene catalyst. In consideration of mechanical strength and high penetration ability, a weight average molecular weight of polyethylene may be in a range of about 0.1 million to about 12 million, for example, about 0.2 million to about 3 million. Polypropylene may be a homopolymer, a random copolymer, or a block copolymer, and these polymers may be used alone or in combination. In addition, a polymerization catalyst may not be limited, and may be a Ziegler-Natta based catalyst or a metallocene catalyst. In addition, stereoregularity is not particularly limited, and isotactic, syndiotactic, or atactic may be used. For example, an inexpensive isotactic polypropylene may be used. In addition, as long as effects of the present invention are not reduced, other polyolefin than polyethylene or polypropylene and an antioxidant may be used together with the polyolefin.

A thickness of the porous base material layer 11 of the separator may be in a range of about 1 μm to about 100 μm. For example, a thickness of the porous base material layer 11 may be in a range of about 1 μm to about 30 μm. For example, a thickness of the porous base material layer 11 may be in a range of about 5 μm to about 30 μm. When the thickness of the porous base material layer 11 is less than 1 μm, it is difficult to maintain mechanical properties, and when the thickness of the porous base material layer 11 is greater than 100 μm, a resistance of a formed battery may increase.

A porosity of the porous base material layer 11 of the separator may be in a range of about 5% to about 95%. When the porosity is less than 5%, a resistance of a formed battery may increase, and when the porosity is greater than 95%, it is difficult for the porous base material layer 11 to retain its mechanical properties.

A pore size of the porous base material layer 11 of the separator may be in a range of about 0.01 μm to about 50 μm. For example, a pore size of the porous base material layer 11 of the separator may be in a range of about 0.1 μm to about 20 μm. When the pore size is less than 0.01 μm, a resistance of a formed battery may increase, and when the pore size is greater than 50 μm, it is difficult for the porous base material layer 11 to retain its mechanical properties.

A lithium battery 1 according to an embodiment of the present invention includes a positive electrode 3, a negative electrode 2; an organic electrolytic solution, and the separator 4 as described above interposed between the positive electrode 3 and the negative electrode 2. When a lithium battery 1 includes the separator 4, an adhesive force between an electrode and the separator 4 may improve, and thus, stability of a formed battery may increase.

The organic electrolytic solution of the lithium battery 1 may include a high-dielectricity solvent and a low boiling point solvent. The high-dielectricity solvent may include at least one selected from the group consisting of ethylene carbonate, propylenecarbonate, butylene carbonate, and gamma-butyrolactone, and the low boiling point solvent may include at least one selected from the group consisting of dimethyl carbonate, ethylmethyl carbonate, diethyl carbonate, dipropyl carbonate, dimethoxyethane, diethoxyethane, and a fatty acid ester derivative.

Hereinafter, an example of a method of manufacturing the lithium battery is described below.

First, a positive electrode 3 is prepared.

For example, a mixture of a positive active material, a conductive agent, a binder, and a solvent is prepared as a positive active material. The positive active material composition may be directly coated on a metal current collector to complete the manufacturing of a positive electrode plate. Alternatively, the positive active material composition may be cast on a separate support, and then, a film separated from the support is laminated on a metal current collector, thereby completing the manufacturing of a positive electrode plate. The positive electrode 3 may also be formed by using other methods.

The positive active material may be any one of various lithium-containing metal oxides that are used in the art. For example, as the positive active material, at least one composite oxide including lithium and metal selected from cobalt, manganese, nickel, and a combination thereof may be used. A detailed example of the positive active material may be a compound represented by any one of the following formulae: $Li_aA_{1-b}B_bD_2$ (wherein $0.90 \le a \le 1.8$, and $0 \le b \le 0.5$); $Li_aE_{1-b}B_bO_{2-c}D_c$ (wherein $0.90 \le a \le 1.8$, $0 \le b \le 0.5$, and $0 \le c \le 0.05$); $LiE_{2-b}B_bO_{4-c}D_c$ (wherein $0 \le b \le 0.5$, and $0 \le c \le 0.05$); $Li_aNi_{1-b-c}Co_bB_cD_\alpha$ (wherein $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Co_bB_cO_{2-\alpha}F_2$ (wherein $0.90 \le a \le 1.8$, $0 \le b \le 0.5$, $0 \le c \le 0.05$, and $0 < \alpha < 2$); $Li_aNi_{1-b-c}Mn_bB_cD_\alpha$ (wherein $0.90 \le a \le 1.8$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein $0.90 \le a \le 1.8$, $0 \le b \le 0.5$, $0 \le c \le 0.05$, and $0 < \alpha < 2$); $Li_aNi_{1-b-c}Mn_bB_cO_{2-\alpha}F_2$ (wherein $0.90 \le a \le 1.8$, $0 \le b \le 0.5$, $0 \le c \le 0.05$, and $0 < \alpha < 2$); $Li_aNi_bE_cG_dO_2$ (wherein $0.90 \le a \le 1.8$, $0 \le b \le 0.9$, $0 \le c \le 0.5$, and $0.001 \le d \le 0.1$); $Li_aNi_bCo_cMn_dGeO_2$ (wherein $0.90 \le a \le 1.8$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1.8$, and $0.001 \le b \le 0.1$); $Li_aCoG_bO_2$ (wherein $0.90 \le a \le 1.8$, and $0.001 \le b \le 0.1$); $Li_aMnG_bO_2$ (wherein $0.90 \le a \le 1.8$, and $0.001 \le b \le 0.1$); $Li_aMn_2G_bO_4$ (wherein $0.90 \le a \le 1.8$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3(0 \le f \le 2)$; $Li_{(3-f)}Fe_2(PO_4)_3(0 \le f \le 2)$; and $LiFePO_4$.

In the formulae above, A is Ni, Co, Mn, or a combination thereof; B is Al, Ni, Co, Mn, Cr, Fe, Mg, Sr, V, a rare-earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

For example, the lithium-containing metal oxide may be $LiCoO_2$, $LiMnxO_2x$ ($x=1, 2$), $LiNi_{1-x}MnxO_2x$ ($0<x<1$), $Ni_{1-x-y}Co_xMn_yO_2$ ($0 \le x \le 0.5$, $0 \le y \le 0.5$), $LiFePO_4$, or the like.

These compounds may have a coating layer on their surfaces for use as the positive active material, or these compounds may be mixed with a compound having a coating layer for use as the positive active material. The coating layer may include an oxide of a coating element, a hydroxide of a coating element, an oxyhydroxide of a coating element, an oxycarbonate of a coating element, or a hydroxycarbonate of a coating element. These compounds that form the coating layer may be amorphous or crystalline. As a coating element included in the coating layer, Mg, Al, Co, K, Na, Ca, Si, Ti, V, Sn, Ge, Ga, B, As, Zr, or a mixture thereof may be used. The coating layer may be formed by using any one of various coating methods that are performed using the compounds and the elements and do not affect properties of the positive active material (for example, spray coating, immersion, or the like). These coating methods are obvious to one of ordinary skill in the art and thus, is not described in detail herein.

As the conductive agent, carbon black or graphite fine particles may be used, and the conductive agent is not limited thereto. For example, the conductive agent may be any one of various conductive agents that are used in the art.

As a binder, a vinylidene fluoride/hexafluoropropylene copolymer, polyvinylidenefluoride (PVDF), polyacrylonitrile, polymethylmethacrylate, polytetrafluoroethylene, a mixture thereof, or a styrene butadiene rubber-based polymer, but the binder is not limited thereto, and any one of materials that are used as a binder in the art may be used herein.

As the solvent, N-methylpyrrolidone, acetone, or water may be used. However, the solvent is not limited thereto, and any one of various materials that are used in the art may be used herein.

Amounts of the positive active material, the conductive agent, the binder, and the solvent may be the same as used in a typical lithium battery. According to the purpose and structure of a lithium battery, one or more of the conductive agent, the binder, and the solvent may not be used.

Then, a negative electrode 2 may be prepared.

For example, a negative active material, a conductive agent, a binder, and a solvent are mixed to prepare an negative active material. The negative active material composition may be directly coated and dried on a metal current collector to complete the manufacture of a negative electrode plate. Alternatively, the negative active material composition may be cast on a separate support, and then, a film separated from the support is laminated on a metal current collector, thereby completing the manufacturing of a negative electrode plate.

The negative active material may be a carbonaceous material, but is not limited thereto, and may be any one of various materials that are used as a negative active material of a lithium battery in the art. For example, the negative active material may include at least one selected from the group consisting of lithium metal, lithium-alloyable metal, a transition metal oxide, a non-transition metal oxide, and a carbonaceous material.

For example, the lithium alloy metal may be Si, Sn, Al, Ge, Pb, Bi, Sb, an alloy of Si and Y (the Y is an alkali metal, an alkali earth metal, a Group 13 element, a Group 14 element, a transition metal, a rare-earth element, or a combination thereof element and is not Si), Sn—Y alloy (the Y is an alkali metal, an alkali earth metal, a Group 13 element, a Group 14 element, a transition metal, a rare-earth element, or a combination thereof element and is not Sn), or the like. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

For example, the transition metal oxide may be titanium oxide, a vanadium oxide, or a lithium vanadium oxide.

For example, the transition metal oxide may be $SnO_2$, $SiO_x$ ($0<x<2$), or the like.

The conductive agent and the binder included in the negative active material composition may be the same as those used in the positive active material composition.

Amounts of the negative active material, the conductive agent, the binder, and the solvent may be the same as used in a typical lithium battery. According to the purpose and structure of a lithium battery 1, one or more of the conductive agent, the binder, and the solvent may not be used.

Then, a separator 4 is prepared.

The separator 4 may include, as described above, a porous base material layer 11, and a polymer coating layer (12 and 13) formed on at least a surface of the base material layer, wherein the polymer coating layer (12 and 13) may include a first fluorinated copolymer, and a non-fluorinated copolymer, and a weight ration of the first fluorinated copolymer to the non-fluorinated copolymer is in a range of 3:1 to 1:3.

Then, an electrolyte is prepared.

The electrolyte may be in a liquid state or a gel state.

For example, an organic electrolytic solution may be prepared. The organic electrolytic solution may be prepared by dissolving a lithium salt in an organic solvent.

As the organic solvent, an organic solvent including a high-dielectricity solvent and a low boiling point solvent may be used. However, the organic solvent is not limited thereto. For example, the organic solvent may be any one of various materials that are used as an organic solvent in the art. For example, the organic solvent may be propylenecarbonate, ethylene carbonate, fluoroethylene carbonate, diethyl carbonate, methylethyl carbonate, methylpropyl carbonate, butylene carbonate, benzonitrile, acetonitrile, tetrahydrofurane, 2-methyltetrahydrofurane, γ-butyrolactone, dioxolane, 4-methyldioxolane, N,N-dimethylformamide, dimethylacetamide, dimethylsulfoxide, dioxane, 1,2-dimethoxyethane, sulforane, dichloroethane, chlorobenzene, nitrobenzene, dimethylcarbonate, methylisopropylcarbonate, ethylpropylcarbonate, dipropylcarbonate, dibutylcarbonate, diethyleneglycole, dimethylether, or a mixture thereof.

The lithium salt may be any one of various materials that are used as a lithium salt in the art. For example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO2)(C_yF_{2y+1}SO_2)$ where x and y are natural numbers, LiCl, LiI, or a mixture thereof may be used.

Figure 2:
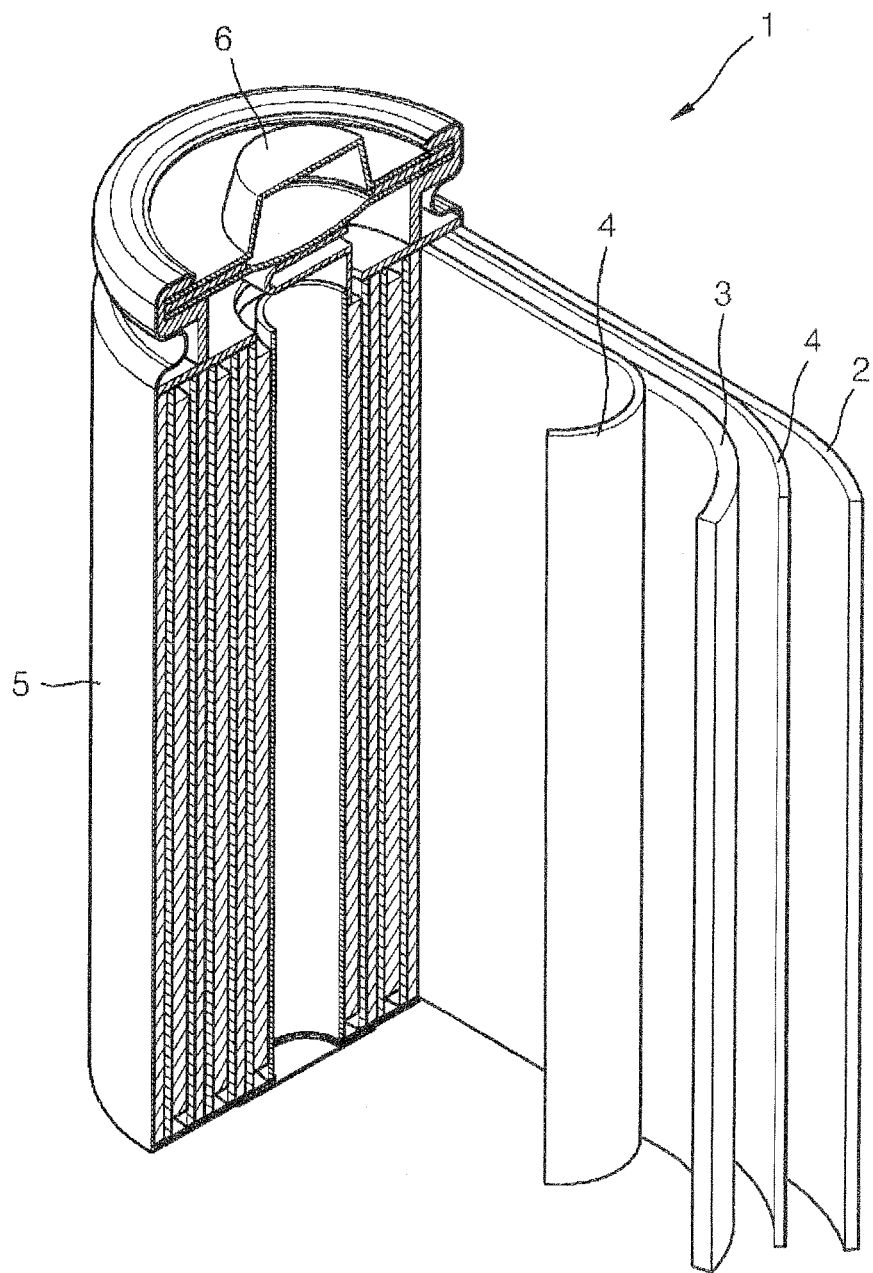
FIG. 2 is a schematic view of a lithium battery according to an embodiment of the present invention.

Referring to FIG. 2, a lithium battery 1 includes a positive electrode 3, a negative electrode 2, and a separator 4. The positive electrode 3, the negative electrode 2, and the separator 4 may form a battery assembly, and the battery assembly may be wound or folded to form a jelly-roll structure, and the jelly-roll structure is placed in a battery case 5. Subsequently, an organic electrolytic solution is injected into the battery case 5, and then, sealed with a cap assembly 6, thereby completing the manufacturing of the lithium battery 1. The battery case 5 may be cylindrical, rectangular, thin film-shaped. In addition, the battery case 5 may have a pouch form that does not have a particular shape. For example, the lithium battery 1 may be a thin film-shaped battery. For example, the lithium battery 1 may be a lithium ion battery.

Also, a plurality of lithium batteries may be stacked to form a battery pack, and the battery pack may be used in various devices that require high capacitance and high power output. For example, the battery assemblies may be used in a notebook computer, a smartphone, an electric vehicle (EV), or the like.

A method of preparing the separator 4 according to an embodiment of the present invention may include coating a polymer solution on at least a surface of a porous base material layer, immersing the coated porous base material layer in a non-solvent, and drying the coated porous base material layer to remove the non-solvent, wherein the polymer solution includes a fluorinated copolymer and a non-fluorinated copolymer at a weight ratio of 3:1 to 1:3.

The coating of the polymer solution may be a dip coating, a Gravure coating, a spray coating, or a spin coating, but is not limited thereto. The coating may be any one of various coating methods that are used in the art.

For example, a polymer solution including a fluorinated copolymer, a non-fluorinated polymer, and NMP is prepared, and then, the polymer solution is coated on a porous base material layer. For phase-separation, the resultant porous base material layer is passed through a bath containing a solvent that is a non-solvent or a poor solvent with respect to the fluorinated copolymer and the non-fluorinated polymer and a good solvent with respect to NMP, thereby forming a porous polymer coating layer. By using these processes, the porous polymer coating layer may have a three-dimensional porous structure that is formed due to rapid organic phase-separation phenomenon of a non-solvent or a poor solvent and has resin frameworks connected to each other. That is, due to the contacting of the polymer solution including a fluorinated copolymer and a non-fluorinated polymer dissolved therein with a solvent that is a non-solvent or a poor solvent with respect to the fluorinated copolymer and the non-fluorinated polymer and a good solvent with respect to NMP that dissolves or disperses the copolymers, high-speed phase separation may occur, and thus, a porous polymer coating layer may have a three-dimensional porous mesh structure.

In the method of preparing a separator 4, a concentration of the polymer solution may be in a range of about 0.1 wt. % to about 50 wt. %. When the concentration of the polymer solution is less than 0.1 wt. %, it is difficult to form a uniform coating layer in the separator, and when the concentration of the polymer solution is greater than 50 wt. %, the polymer solution may have low solubility and high viscosity, thereby being inappropriate for the formation of a separator.

In the method of preparing a separator 4, the drying may be performed at the temperature of about 30° C. to about 130° C. for 30 minutes to 300 minutes. When the drying temperature is lower than 30° C., the drying time may be too long, and thus, it is difficult to form a separator. In addition, when the drying temperature is higher than 130° C., a formed separator 4 may be deformed by shrinking. In addition, when the drying time is less than 30 minutes, the non-solvent existing on the surface of the separator 4 may not be sufficiently removed, and when the drying time is longer than 300 minutes, the drying time is too long, and thus, it is difficult to form a separator effectively.

As a solvent used to prepare the polymer solution, acetone, tetrahydrofuran, methylene chloride, chloroform, dimethylformamide, N-methyl-2-pyrrolidone (NMP), cyclohexane, or a mixture thereof may be used, but the solvent is not limited thereto. For example, such a solvent may be any one of various solvents that dissolve the copolymers and are used in the art.

The non-solvent or the poor solvent may be an alcohol, such as methanol, ethanol, propanol, or butanol, or water, but is not limited thereto. The non-solvent or the poor solvent may be one of various materials that are used as a non-solvent or poor solvent in the art.

The porous base material layer 11 may be formed by using any one of various methods that are known and publically used. For example, the porous base material layer 11 may be formed by using a dry method: polypropylene or polyethylene is molten and extruded to form a film thereof, and the film is annealed at low temperature to grow a crystal domain and, in this state, elongation is performed thereon to extend an amorphous region to form a microporous film. For example, the porous base material layer 11 may be formed by using a wet method: a small molecule material, such as a hydrocarbon solvent, is mixed with polypropylene or polyethylene, and then, a film thereof is formed, and subsequently, when the solvent or the small molecule gathers to form an island phase within amorphous phase, the solvent or the small molecule are removed by using other volatile solvent to form a microporous film.

For controlling strength, hardness, and thermal shrinking, the porous base material layer 11 may include a non-conductive particle, other fillers, or a fiber compound. In addition, to improve adhesiveness or decrease a surface tension with an electrolytic solution to improve immersion characteristics of a solution, when a polymer is stacked on a base material layer, the base material layer may be surface-coated with a small molecule compound or a polymer compound in advance, or may undergo an electron beam treatment using, for example, ultraviolet rays, or a plasma treatment using, for example, a corona discharge or plasma gas. In addition, in terms of high immersion characteristics of an electrolytic solution and high adhesion to a porous film containing a non-conductive particle and a binder, the base material layer may be coated with a polymer compound including a polar group, such as a carboxylic acid group, a hydroxyl group, or a sulfonic acid group.

To increase tear strength and mechanical strength, the porous base material layer may have a multi-layer structure including at least one layer. In detail, the porous base material layer may be a stack of a polyethylene microporous film and a polypropylene microporous film, or a stack of a non-woven fabric and a polyolefin-based microporous film.

The polymer coating layer (12 and 13) may additionally include an inorganic particle. Due to the inclusion of the inorganic particle, a formed separator may have high oxidation resistance, and deterioration of characteristics of a battery may be suppressed. The inorganic particle may be alumina ($Al_2O_3$), silica ($SiO^2$), or titania ($TiO_2$). An average particle size of the inorganic particle may be in a range of about 10 nm to about 5 μm. When the average particle size of the inorganic particle is less than 10 nm, crystallinity of the inorganic particle decreases and the use of the inorganic particle may not result in expected results, and when the average particle size of the inorganic particle is greater than 5 μm, the inorganic particle may not be dispersed well.

Hereinafter, embodiments of the present invention are described in detail with reference Examples. However the present invention is not limited to the Examples.

Preparation of Separator 4

EXAMPLE 1

Four parts by weight of a polyvinylidenefluoride-polytetrafluoroethylene-hexafluoropropylene copolymer (PVDF-PTFE-HFP, weight average molecular amount (Mw) 450,000, DAIKIN) was added to 96 parts by weight of N-methyl-2-pyrrolidone to prepare a 4 wt. % copolymer-dissolved polymer solution. 8 parts by weight of polyacrylate (ZEON) was added to 92 parts by weight of N-methyl-2-pyrrolidone to prepare a 8 wt. % polymer-dissolved acryl-based polymer solution. The fluorinated copolymer solution and the acryl-based polymer solution were mixed at a weight ratio of 1:1 to prepare a mixed solution.

The mixed solution was coated on both surfaces of a polyethylene porous film (ASAHI, ND509) having a thickness of 9 μm used as a base material layer by using a bar coater to form polymer coating layers (12 and 13) having a thickness of 2 μm. That is, the sum of thicknesses of the polymer coating layers was 4 μm respectively. A porous film on which the coating layers were formed was placed in a water bath to induce phase separation, and then, dried with hot blast at the temperature of 80° C. for 15 minutes to prepare a separator in which a polymer coating layer is formed on both surfaces of the porous base material layer.

EXAMPLE 2

A separator 4 was prepared in the same manner as in Example, 1, except that instead of polyvinylidenefluoride-polytetrafluoroethylene-hexafluoropropylene copolymer, a polyvinylidenefluoride-polytetrafluoroethylene copolymer (PVDF-PTFE, weight average molecular amount (Mw) 450,000, DAIKIN) was used.

EXAMPLE 3

A separator 4 was prepared in the same manner as in Example, 1, except that instead of polyvinylidenefluoride-polytetrafluoroethylene-hexafluoropropylene copolymer, a polyvinylidenefluoride-hexafluoropropylene copolymer (PVDF-HFP, weight average molecular amount (Mw) 450,000, SOLVAY) was used.

EXAMPLE 4

A separator 4 was prepared in the same manner as in Example, 1, except that the fluorinated copolymer solution and the acryl-based polymer solution were mixed at a weight ratio of 4:1 to prepare a mixed solution.

EXAMPLE 5

A separator 4 was prepared in the same manner as in Example, 2, except that the fluorinated copolymer solution and the acryl-based polymer solution were mixed at a weight ratio of 4:1 to prepare a mixed solution.

EXAMPLE 6

A separator 4 was prepared in the same manner as in Example, 3, except that the fluorinated copolymer solution and the acryl-based polymer solution were mixed at a weight ratio of 4:1 to prepare a mixed solution.

COMPARATIVE EXAMPLE 1

A separator 4 was prepared in the same manner as in Example, 1, except that only the 4 wt. % copolymer-dissolved polymer solution prepared by adding 4 parts by weight of a polyvinylidenefluoride-hexafluoropropylene copolymer (PVDF-HFP, weight average molecular amount (Mw) 1,100,000, KUREHA) to 96 parts by weight of N-methyl-2-pyrrolidone was used.

COMPARATIVE EXAMPLE 2

A separator 4 was prepared in the same manner as in Example, 1, except that only the 4 wt. % copolymer-dissolved polymer solution prepared by adding 4 parts by weight of a polyvinylidenefluoride-hexafluoropropylene copolymer (PVDF-HFP, weight average molecular amount of 450,000, SOLVAY) to 96 parts by weight of N-methyl-2-pyrrolidone was used.

COMPARATIVE EXAMPLE 3

A separator 4 was prepared in the same manner as in Example, 1, except that only the 4 wt. % copolymer-dissolved polymer solution prepared by adding 4 parts by weight of a polyvinylidenefluoride-polytetrafluoroethylene-hexafluoropropylene copolymer (PVDF-PTFE-HFP, weight average molecular amount (Mw) 450,000, DAIKIN) to 96 parts by weight of N-methyl-2-pyrrolidone was used.

COMPARATIVE EXAMPLE 4

A separator 4 was prepared in the same manner as in Example, 1, except that only the 4 wt. % copolymer-dissolved polymer solution prepared by adding 4 parts by weight of a polyvinylidenefluoride-polytetrafluoroethylene copolymer (PVDF-PTFE, weight average molecular amount (Mw) 450,000, DAIKIN) to 96 parts by weight of N-methyl-2-pyrrolidone was used.

COMPARATIVE EXAMPLE 5

A separator 4 was prepared in the same manner as in Example, 1, except that only a 8 wt. % polymer-dissolved polymer solution prepared by adding 8 parts by weight of polyacrylate (ZEON) to 92 parts by weight of N-methyl-2-pyrrolidone was used.

Preparation of Negative Electrode 2

PREPARATION EXAMPLE 1

97 wt. % graphite particles (C1SR, Japan carbon) having an average particle size of 25 μm, 1.5 wt. % styrene-butadiene rubber (SBR) binder (ZEON), and 1.5 wt. % carboxymethylcellulose (CMC, NIPPON A&L) were mixed and the mixture was added to distilled water, and the resultant mixture was stirred by using a mechanical stirrer for 60 minutes to prepare a negative active material slurry. The slurry was coated on a copper current collector having a thickness of 10 μm by using a doctor blade to form a coating layer having a thickness of about 60 fall, and then, the coating layer was dried in a heat blast drier at the temperature of 100° C. for 0.5 hours, and then, dried in a vacuum condition at the temperature of 120° C. for 4 hours, and roll-pressed, thereby completing the preparation of a negative electrode plate.

Preparation of Structure Including Negative Electrode 2 and Separator 4

EXAMPLE 7

The negative electrode plate prepared according to Preparation Example 1 was brought to contact the separator 4 prepared according to Example 1, and then, the resultant structure was inserted into a pouch, and the pouch was filled with each of organic electrolytic solutions prepared by dissolving 1M LiPF6 in a) an ethylenecarbonate (EC)/ethylmethylcarbonate (EMC)/diethylenecarbonate (DEC) mixed solvent in which a volumetric ratio of EC:EMC:DEC was 3:5:2, b) an ethylenecarbonate (EC)/ethylpropionate (EP)/difluoroether (FE) mixed solvent in which a volumetric ratio of EC:EP:FE was 2:6:2, c) an ethylenecarbonate (EC)/propylenecarbonate (PC)/ethylpropionate (EP) mixed solvent in which a volumetric ratio of EC:PC:EP was 3:1:6, and d) an ethylenecarbonate (EC)/propylenecarbonate (PC)/ethylpropionate (EP)/difluoroether (FE) mixed solvent in which an a volumetric ratio of EC:PC:EP:FE was 2:1:6:1, and then, the pouch was vacuum-sealed. The sealed pouches were compressed at a high temperature of 100° C. to prepare negative electrode/separator structures according to a solvent.

EXAMPLES 8 TO 12

Structures were manufactured in the same manner as in Example 7, except that the separators 4 prepared according to Examples 2 to 6 were used.

COMPARATIVE EXAMPLES 6 TO 10

Structures were manufactured in the same manner as in Example 7, except that the separators prepared according to Comparative Examples 1 to 5 were used.

Preparation of Positive Electrode 3 and Lithium Battery 1

EXAMPLE 13

97 wt. % LiCoO$_2$, 1.5 wt. % carbon black powder as a conductive agent, and 1.5 wt. % polyvinylidenefluoride (PVdF, SOLVAY) were mixed and the mixture was added to a N-methyl-2-pyrrolidone solvent. Then, resultant mixture was stirred by using a mechanical stirrer for 30 minutes to prepare a positive active material slurry. The slurry was coated on an aluminum current collector having a thickness of 20 μm by using a doctor blade to form a coating layer having a thickness of about 60 μm, and then, the coating layer was dried in a heat blast drier at the temperature of 100° C. for 0.5 hours, and then, dried in a vacuum condition at the temperature of 120° C. for 4 hours, and roll-pressed, thereby completing the preparation of a positive electrode plate.

The separator 4 prepared according to Example 1 was interposed between the positive electrode plate and the negative electrode plate prepared according to Preparation Example 1, and then, the resultant structure was inserted into a pouch, and the pouch was filled with each of electrolytic solutions prepared by dissolving 1M LiPF$_6$ in the same solvents described in Example 7, and the pouches were vacuum-sealed and pressed at a high temperature of 100° C. to prepare a pouch cell.

EXAMPLES 14 TO 18

Lithium batteries 1 were manufactured in the same manner as in Example 13, except that instead of the separator prepared according to Example 1, the separators 4 prepared according to Examples 2 to 6 were used.

COMPARATIVE EXAMPLES 11 TO 15

Lithium batteries 1 were manufactured in the same manner as in Example 13, except that instead of the separator prepared according to Example 1, the separators prepared according to Comparative Examples 1 to 5 were used.

EVALUATION EXAMPLE 1

Adhesive Force Evaluation

An adhesive force between a negative electrode 2 and a separator 4 was evaluated after the pouches were removed from the structures manufactured according to Examples 7 to 12 and Comparative Examples 6 to 10. As a way to evaluate the adhesive force, an peel test was performed.

The negative electrode 2/separator 4 structures from which the pouches were removed, were mounted on an peel strength tester (INSTRON Company) to measure an peel strength between a negative electrode and a separator.

Adhesive force test results are shown in Table 1.

TABLE 1

|  | Electrolytic solution | Adhesive force |
|---|---|---|
| Example 7 | a) | 0.020 |
|  | b) | 0.017 |
|  | c) | 0.029 |
|  | d) | 0.030 |
| Example 8 | a) | 0.017 |
|  | b) | 0.031 |
|  | c) | 0.035 |
|  | d) | 0.037 |
| Example 9 | a) | 0.023 |
|  | b) | 0.019 |
|  | c) | 0.023 |
|  | d) | 0.023 |
| Example 10 | a) | 0.016 |
|  | b) | 0.012 |
|  | c) | 0.007 |
|  | d) | 0.011 |
| Example 11 | a) | 0.017 |
|  | b) | 0.012 |
|  | c) | 0.013 |
|  | d) | 0.013 |

TABLE 1-continued

|  | Electrolytic solution | Adhesive force |
|---|---|---|
| Example 12 | a) | 0.026 |
|  | b) | 0.032 |
|  | c) | 0.022 |
|  | d) | 0.032 |
| Comparative Example 6 | a) | 0 |
|  | b) | 0 |
|  | c) | 0 |
|  | d) | 0 |
| Comparative Example 7 | a) | 0.020 |
|  | b) | 0 |
|  | c) | 0.021 |
|  | d) | 0.026 |
| Comparative Example 8 | a) | 0 |
|  | b) | 0 |
|  | c) | 0 |
|  | d) | 0 |
| Comparative Example 9 | a) | 0.02 |
|  | b) | 0 |
|  | c) | 0 |
|  | d) | 0 |
| Comparative Example 10 | a) | 0.03 |
|  | b) | 0 |
|  | c) | 0.048 |
|  | d) | 0.036 |

As shown in Table 1, an adhesive force of the structures of Examples 7 to 12 was substantially higher than that of those of Comparative Examples 6 to 10. In particular, with respect to the electrolytic solution b), the separator showed an excellent adhesive force.

EVALUATION EXAMPLE 2

Lifetime Characteristics Evaluation

The coin cells manufactured according to Examples 13 to 18 and Comparative Examples 11 to 15 were charged and discharged once with a constant current of 0.1 C rate at the temperature of 25° C. in a voltage range of 3.6 to 4.3V with respect to lithium metal (formation process).

Lithium batteries 1 that underwent the formation process were charged and discharged once with a constant current of 0.2 C rate at the temperature of 25° C. in a voltage range of 3.6 to 4.3 V with respect to lithium metal (standard charging and discharging process).

Subsequentially, the coin cells were charged and discharged 100 times with a constant current of 0.2 C rate at the temperature of 25° C. in a voltage range of 3.6 to 4.3 V to evaluate lifetime characteristics thereof. A capacitance retention ratio is calculated by Equation 1.

$$\text{Capacitance retention ratio} = [\text{discharge capacitance in 100th cycle/discharge capacitance in 1st}] \times 100 \quad \text{Equation 1}$$

The lithium batteries 1 of Examples 13 to 18 including the structures of Examples 7 to 12 had an improved capacitance retention ratio, that is, improved lifetime characteristics compared to the lithium batteries of Comparative Examples 6-10.

According to embodiments of the present invention, an adhesive force between an electrode and a separator 4 may be improved due to the inclusion of a separator in which a polymer coating layer including a fluorinated copolymer and a non-fluorinated copolymer is formed on a porous base material layer.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A separator, comprising:
   a porous base material layer; and
   a polymer coating layer formed on at least a surface of the base material layer,
   wherein the polymer coating layer comprises a first fluorinated copolymer, and a non-fluorinated polymer, and a weight ratio of the first fluorinated copolymer to the non-fluorinated polymer is in a range of 3:1 to 1:3.

2. The separator of claim 1, wherein the weight ratio of the first fluorinated copolymer to the non-fluorinated polymer is in a range of 2:1 to 1:2.

3. The separator of claim 1, wherein the first fluorinated copolymer is one selected from the group consisting of a polyvinylidene fluoride-hexafluoropropylene (PVdF-HFP) copolymer, a polyvinylidene fluoride-polytetrafluororoethylene (PVdF-PTFE) copolymer, and a polyvinylidene fluoride-polytetrafluororoethylene-hexafluoropropylene (PVdF-PTFE-HFP) copolymer.

4. The separator of claim 1, wherein a weight average molecular amount of the first fluorinated copolymer is in a range of about 10,000 to about 1,500,000.

5. The separator of claim 1, wherein a weight average molecular amount of the first fluorinated copolymer is in a range of about 10,000 to about 600,000.

6. The separator of claim 1, wherein the non-fluorinated polymer has a higher surface energy than the first fluorinated polymer.

7. The separator of claim 1, wherein the non-fluorinated polymer has a surface energy of about 35 mN/m or more at the temperature of 20° C.

8. The separator of claim 1, wherein the non-fluorinated polymer comprises at least one selected from the group consisting of polyacrylate, polymethacrylate, polyamide (PA), polyimide (PI), a polyamide-imide copolymer, polyacrylonitrile (PAN), polyethyleneoxide (PEO), polypropyleneoxide (PPO), a polyethyleneoxide-proyleneoxide (PEO-PO) copolymer, polyvinylacetate (PVA), polyethylenevinylacetate (PEVA), and polymethylmethacrylate (PMMA).

9. The separator of claim 1, wherein the non-fluorinated polymer is a polymer obtained from at least one monomer selected from the group consisting of an acrylic acid, methylacrylate, ethylacrylate, methylmethacrylate, and methylethacrylate.

10. The separator of claim 1, wherein the polymer coating layer is formed as a gel.

11. The separator of claim 1, wherein the polymer coating layer additionally comprises at least one second fluorinated polymer that is different from the first fluorinated copolymer.

12. The separator of claim 1, wherein the porous base material layer comprises polyolefin.

13. The separator of claim 1, wherein a thickness of the porous base material layer is in a range of about 1 μm to about 100 μm.

14. A lithium battery comprising:
   a positive electrode;
   a negative electrode; and
   an organic electrolytic solution,
   wherein a separator of claim 1 is interposed between the positive electrode and the negative electrode.

15. The lithium battery of claim 14, wherein the organic electrolytic solution comprises a high-dielectricity solvent and a low boiling point solvent.

16. The lithium battery of claim 15, wherein the high-dielectricity solvent is selected from ethylene carbonate, propylenecarbonate, butylene carbonate, and gamma-butyrolactone.

17. The lithium battery of claim 15, wherein the low boiling point solvent comprises at least one selected from the group consisting of dimethyl carbonate, ethylmethyl carbonate, diethyl carbonate, dipropyl carbonate, dimethoxyethane, diethoxyethane, and a fatty acid ester derivative.

18. A method of preparing a separator, the method comprising:
- coating a polymer solution on at least a portion of the porous base material layer;
- immersing the coated porous base material layer in a non-solvent; and
- drying the coated porous base material layer to remove the non-solvent,
- wherein the polymer solution comprises a fluorinated copolymer and a non-fluorinated copolymer at a weight ratio of 3:1 to 1:3.

19. The method of claim 18, wherein a concentration of the polymer solution is in a range of about 0.1 wt. % to about 50 wt. %.

20. The method of claim 18, wherein the drying is performed at a temperature range of about 30° C. to about 130° C. for a time period range of about 30 minutes to about 300 minutes.

* * * * *